United States Patent [19]

Nelson

[11] Patent Number: 5,222,577
[45] Date of Patent: Jun. 29, 1993

[54] SYSTEM FOR INTRODUCING A FLUID

[76] Inventor: Jerry D. Nelson, 17315 Tobacco Rd., Lutz, Fla. 33549

[21] Appl. No.: 820,151

[22] Filed: Jan. 13, 1992

Related U.S. Application Data

[63] Continuation-in-part of Ser. No. 634,016, Dec. 26, 1990.

[51] Int. Cl.⁵ .............................................. F16N 21/00
[52] U.S. Cl. ................................ 184/15.1; 184/105.1; 184/55.1
[58] Field of Search .................. 440/62, 63, 53; 74/502.6; 184/55.1, 105.1, 105.3, 105.2, 15.1

[56]     References Cited
U.S. PATENT DOCUMENTS

| | | | |
|---|---|---|---|
| 2,083,937 | 6/1937 | Begg | 184/15.1 |
| 2,681,711 | 6/1954 | Sievenpiper | 184/105.1 |
| 3,143,994 | 8/1964 | Morse | 440/62 |
| 3,565,213 | 12/1968 | Heller | 184/105.1 |
| 4,027,743 | 6/1977 | Deller et al. | 184/105.1 |
| 4,415,064 | 11/1983 | Oliemuller | 184/15.1 |
| 4,554,998 | 11/1985 | Kenny | 184/105.1 |
| 4,572,332 | 2/1986 | Pool | 184/105.1 |
| 4,671,385 | 6/1987 | Travis | 184/15.1 |
| 4,735,165 | 4/1988 | Baba et al. | 440/62 |
| 4,815,994 | 3/1989 | Hickham, Jr. | 440/62 |

FOREIGN PATENT DOCUMENTS 0746071  5/1933  France .............................. 184/15.1

Primary Examiner—Ira S. Lazarus
Assistant Examiner—Alan B. Cariaso
Attorney, Agent, or Firm—Frijouf, Rust & Pyle

[57]     ABSTRACT

An apparatus and method is disclosed for an improved system for introducing a fluid into a cable mounting tube of an outboard motor for treating an inner cable of a motorboat steering device. The improvement comprises a pressurizer tube having a sealed first end and a second end having a connector for attaching the pressurizer tube to a threaded exit end of the cable mounting tube. The fluid is introduced into the pressurizer tube and a pressurized gas is applied to the pressurizer tube for driving the fluid into the cable mounting tube for treating the inner cable.

11 Claims, 8 Drawing Sheets

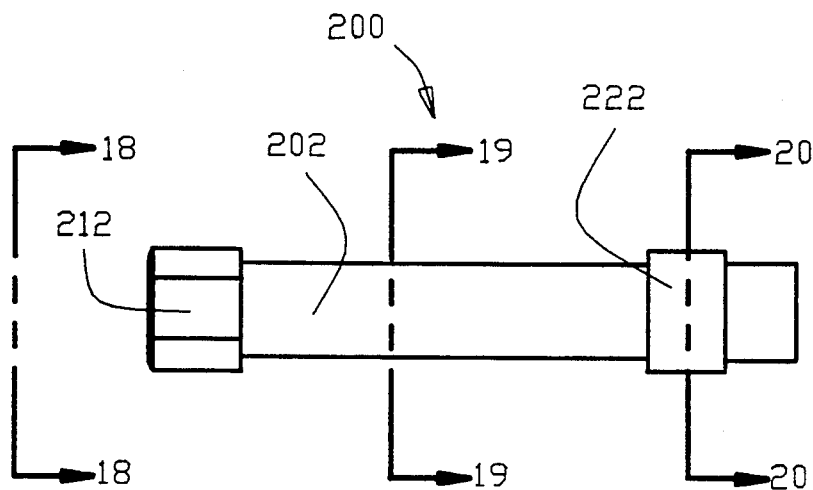
FIG. 17
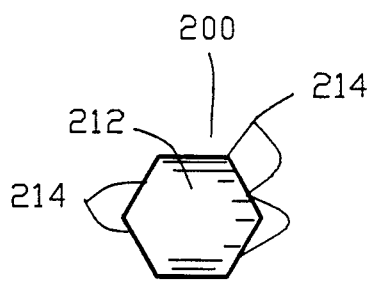 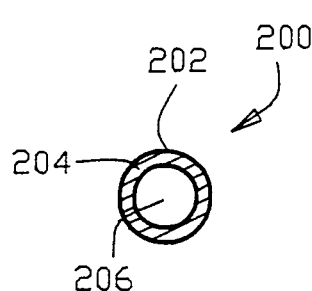 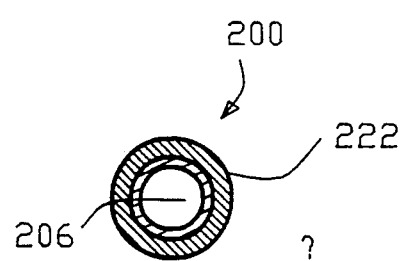
FIG. 18   FIG. 19   FIG. 20
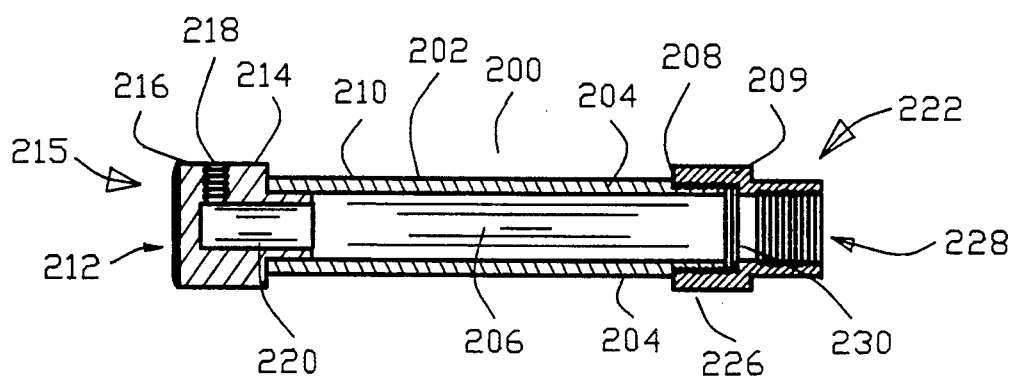
FIG. 21

SYSTEM FOR INTRODUCING A FLUID

CROSS-REFERENCE TO RELATED APPLICATIONS

This is a continuation-in-part of U.S. patent application Ser. No. 634,016 filed Dec. 26, 1990. All subject matter set forth in application serial number 634,016 is hereby incorporated by reference into the present application as if fully set forth herein.

BACKGROUND OF THE INVENTION

Field Of The Invention

This invention relates to an outboard motor steering system, and more specifically to a system for introducing a fluid into a cable mounting tube of an outboard motor for treating an inner cable of a motorboat steering device.

The original purpose of an outboard motor was to provide a small portable motor for a rowboat. As the outboard motor evolved, significant improvements were implemented in the output horsepower of the outboard motor. As a consequence of the increase in the output horsepower of the outboard motor the size and weight of the outboard motor increased dramatically. The early outboard motors, as well as many of the present day low horsepower outboard motors, were steered by a manually operated steering tiller. An operator of the outboard motor was position in the stern of the vessel, as is well known to those skilled in the art.

As outboard powered vessels increased in the available horsepower and size, remote engine controls and steering were developed enabling the operator to be positioned forward in the vessel to provide a more unobstructed view for the operator. In addition, the weight distribution in the vessel was improved when the operator was positioned forward in the vessel.

Early steering systems comprised a steering wheel for rotating a cable drum. A flexible steering cable was wrapped about the cable drum near the center of the cable and both ends of the cable were attached to the outboard motor. The cable was guided by a series of pulleys attached to the vessel. Rotating the steering wheel and the cable drum changed the position of one end of the cable relative to the other end of the cable, thereby causing the motor to pivot and to steer the vessel. This steering system was commonly referred to as a cable/pulley system.

This steering system remained virtually unimproved for many years and performed satisfactorily in service with only minor maintenance. As motor horsepower continued to increase, it became apparent that the cable/pulley system would no longer provide satisfactory results.

The next innovation in steering systems was to provide a steering wheel affixed to a helm unit which converts the rotary steering action to a linear push-pull action of a cable within a cable sheath. The sheathed cable was led from the steering station to an aft motor location where the cable sheath was directed and affixed to a cable mounting tube which was an integral part of the motor mount. The cable exited from the opposite end of the cable mounting tube from the cable sheath and was linked to the outboard motor. Rotation of the steering wheel effected an extension or retraction of the cable relative to the cable sheath, thereby effecting a pivoting action of the outboard motor. Other variations of this system were developed for outboard motors without integral cable mounting tubes. This steering system was commonly referred to as a sheathed cable system.

The sheathed cable steering system has been a substantial improvement over the cable/pulley system since the sheathed cable system offers more positive steering with less effort and requires less maintenance than the cable/pulley system.

Unfortunately, the sheathed cable steering system suffers from a serious corrosion problem whereby the extension and retraction of the cable from the cable mounting tube permits the entry of foreign materials into the cable mounting tube. Entry of corrosive materials such as seawater produces corrosion byproducts which require an increase in steering effort to overcome the increased friction between the cable and the cable mounting tube. Ultimately, seizure of the cable within the cable mounting tube will occur unless the problem is addressed. The recommendations of the manufacturers call for the application of grease on the surface of the cable external to the cable mounting tube in an effort to introduce lubrication into the interior of the cable mounting tube. This lubrication scheme has met with little success.

In my prior invention set forth in U.S. patent application 634,016 filed Dec. 26, 1990, I disclosed an apparatus and method for introducing a lubricant into a cable mounting tube of a pivotable outboard motor that is fully set forth The improved system has proven successful in preventing the characteristic entry of foreign materials into the cable mounting tube and preventing subsequent corrosion and possible seizure of the steering cable.

When my prior invention was installed on a new or noncorroded outboard motor steering system, continued successful operation is assured with periodic lubrication. However, the installation of my prior invention on an outboard motor/steering system which has been subjected to the intrusion of foreign materials resulting in subsequent corrosion and possible seizure of the steering cable is ineffective unless the corrosion removal and/or release of the seized steering cable is accomplished prior to the installation of the previously described improved invention.

Corrosion removal and/or release of a seized steering cable requires a labor intensive process of disassembly, cleaning and replacement of the affected components. The present invention overcomes the difficulties normally encountered in corrosion removal and seized component release.

Therefore it is an object of this invention to provide an improved system for introducing a fluid into a cable mounting tube of an outboard motor for treating an inner cable of a motorboat steering device within the cable mounting tube of the outboard motor.

Another object of this invention is to provide an improved method for introducing a fluid into a cable mounting tube of an outboard motor for treating an inner cable of a motorboat steering device within the cable mounting tube of the outboard motor wherein a fluid is driven into the cable mounting tube by a pressurized gas thereby treating the inner cable.

Another object of this invention is t o provide an improved system for introducing a fluid into a cable mounting tube of an outboard motor for treating an inner cable of a motorboat steering device within the cable mounting tube of the outboard motor comprising the driving of a solvent into the cable mounting tube of the outboard motor by a pressurized gas.

Another object of this invention is to provide an improved system for introducing a fluid into a cable mounting tube of an outboard motor for treating an inner cable of a motorboat steering device within the cable mounting tube of the outboard motor comprising the driving of a lubricant into the cable mounting tube of the outboard motor by a pressurized gas.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention with in the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved method and apparatus for introducing a fluid into a cable mounting tube of an outboard motor for treating an inner cable of a motorboat steering device within the cable mounting tube of an outboard motor. The steering device comprises an inner cable being linearly movable within an outer sheath with the outer sheath having a sheath nut for threadably affixing to a threaded entrance end of the cable mounting tube of an outboard motor. A distal end of the inner cable extends from a threaded exit end of the cable mounting tube of the outboard motor and the distal end of the inner cable is connected for pivoting the outboard motor in response to the motorboat steering device. The sheath nut is removed from the threaded entrance end of the cable mounting tube and the distal end of the inner cable connection is disconnected from the outboard motor. The improvement comprises a pressurizer tube having a sidewall, a first and a second end defining a pressurizer tube bore. A connecting means is disposed at the first end of the pressurizer tube for attaching the pressurizer tube to the threaded exit end of the cable mounting tube. A sealing means seals the second end of the pressurizer tube and an input means communicates with the pressurizer tube bore for introducing the fluid into the pressurizer tube bore of the pressurizer tube. A pressure means communicates with the pressurizer tube bore for applying a pressurized gas to the pressurizer tube bore for driving the fluid into the cable mounting tube for treating the inner cable.

The invention is also incorporated into the method of introducing a fluid into a cable mounting tube of an outboard motor for treating an inner cable of a motorboat steering device within the cable mounting tube of the outboard motor. The improved method comprises encasing the distal end of the inner cable extending from a threaded exit end of the cable mounting tube, introducing the fluid into the encasement, and applying a pressurized gas to the encasement for driving the fluid into the cable mounting tube for treating the inner cable.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 17 is an elevation view of the pressurizer tube with sealing means and connecting means of the present invention;

FIG. 18 is an end view along line 18—18 of FIG. 17;

FIG. 19 is a cross-sectional view along line 19—19 of FIG. 17;

FIG. 20 is a cross-sectional view along line 20—20 of FIG. 17;

FIG. 21 is a sectional view of the pressurizer tube with sealing means and connecting means of the present invention;

Similar reference characters refer to similar parts throughout the several Figures of the drawings.

DETAILED DISCUSSION

Figure 1:
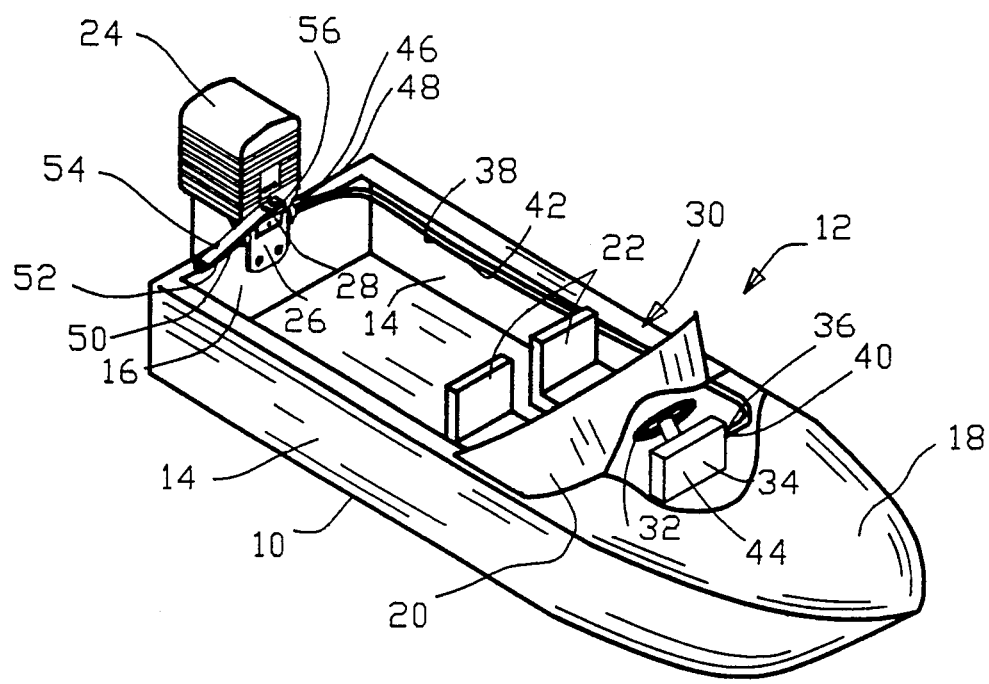
FIG. 1 is an isometric view of an outboard motorboat including an installed sheathed cable steering system.
Figure 2:
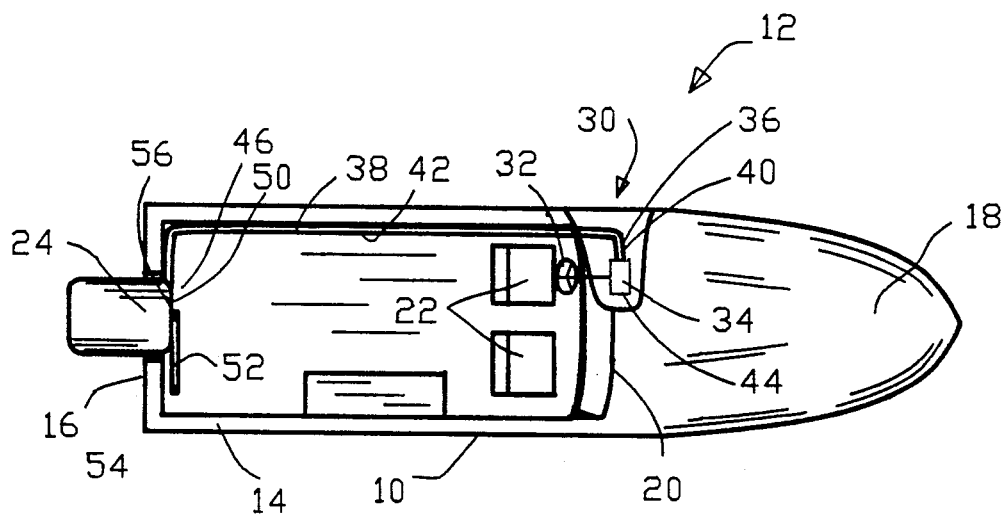
FIG. 2 is a plan view of the outboard motorboat of FIG. 1.
Figure 3:
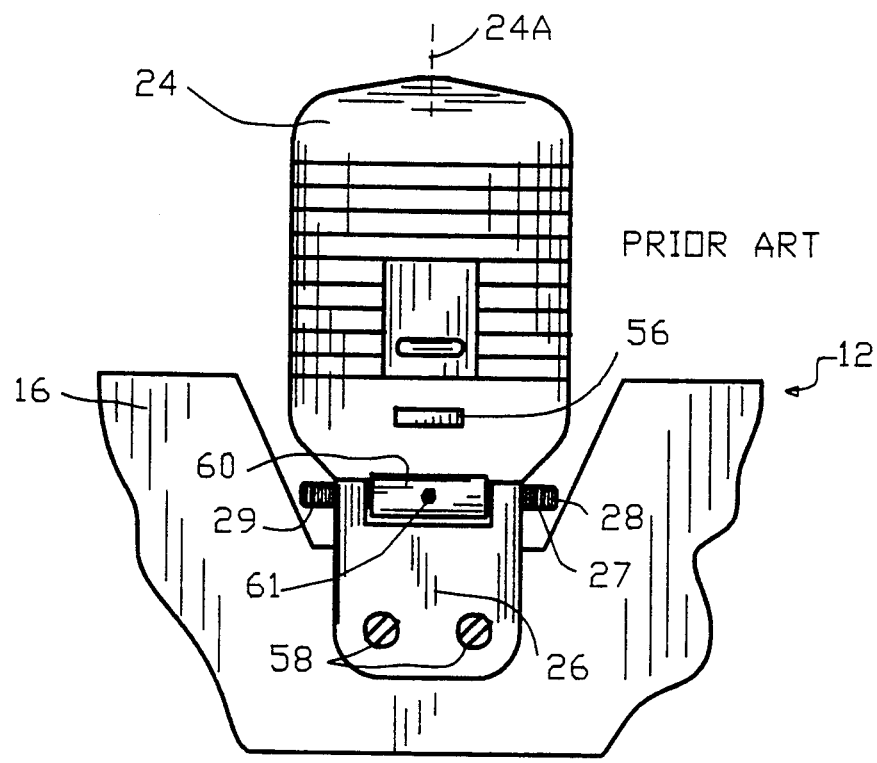
FIG. 3 is an elevation view of the interior transom of an outboard motorboat of FIGS. 1 and 2.
Figure 4:
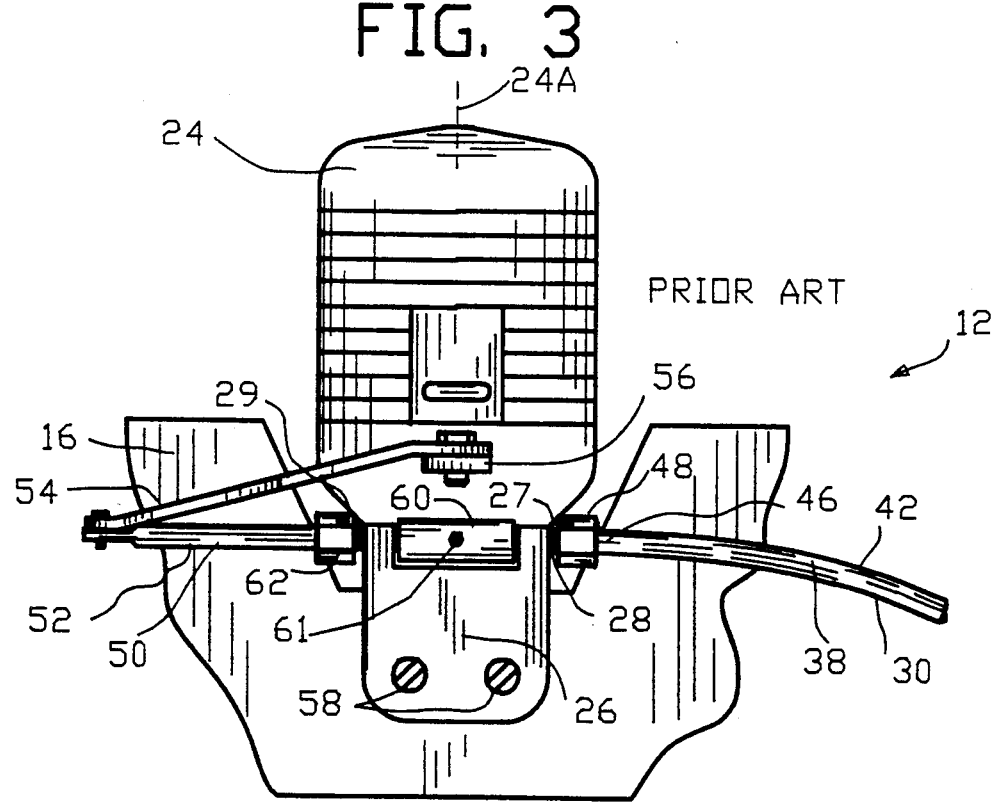
FIG. 4 is an elevation view of the interior transom of an outboard motorboat of FIG. 3 with a sheathed cable steering system installed on the outboard motor.

FIGS. 1 and 2 are isometric and plan views of an outboard motorboat 12 including a hull 10, sides 14 and a transom 16. A deck 18 is affixed to the hull 10 with a windshield 20 mounted on the deck 18. Seats 22 are mounted inside the hull 10. An outboard motor 24 is mounted on the transom 16 by way of an outboard motor mount 26. As also shown in FIGS. 3 and 4, a cable mounting tube 28 is an integral part of the outboard motor mount 26 and comprises an externally threaded entrance end 27 and an externally threaded exit end 29. The outboard motor 24 pivots about a vertical axis 24A to control the direction of the outboard motorboat 12 in response to a sheathed cable steering system 30.

The sheathed cable steering system 30 comprises a steering wheel 32 affixed to a helm unit 34. A first end 36 of an inner cable 38 is affixed to an internal mechanism (not shown) of the helm unit 34. A first end 40 of an outer sheath 42 is affixed to a case 44 of the helm unit 34. A second end 46 of the outer sheath 42 is fixed to the externally threaded entrance end 27 of the cable mounting tube 28 by means of a sheath nut 48. A second end 50 of the inner cable 38 comprises a rigid rod 52 extending through and exiting from the externally threaded exit end 29 of the cable mounting tube 28. A steering link 54 connects the rigid rod 52 to a tiller arm 56 of the outboard motor 24. A finish nut 62 is affixed to the externally threaded exit end 29 of cable mounting tube 28 opposite the connection of the outer sheath 42 and the sheath nut 48.

In operation, a clockwise rotation of the steering wheel 32 produces a linear retraction of the inner cable 38 relative to the outer sheath 42, by means of a rotational-to-linear motion conversion action of the helm unit 34. The retraction of inner cable 38 effects a retraction of the rigid rod 52 which is affixed to the second end 50 of the inner cable 38. The connection of the outboard motor 24 tiller arm 56 to the rigid rod 52 by means of the steering link 54 completes the mechanical connections required to pivot the outboard motor 24 about the vertical axis 24A in response to the actions of sheathed cable steering system 30.

FIG. 3 is an elevational view of the interior transom 16 of the outboard motorboat 12 of FIGS. 1 and 2 prior to the installation of the sheathed cable steering system 30. The outboard motor 24 is affixed to the transom 16 by means of the motor mount 26 and mounting bolts 58. The cable mounting tube 28 extends through the motor mount 26 and provides a support for a tilt hinge 60 of the outboard motor 24. The tilt hinge 60 rotates about a horizontal axis of the cable mounting tube 28 to enabling the outboard motor 24 to tilt forward as should be well known to those skilled in the art. A tilt hinge grease fitting 61 is provided for greasing the tilt hinge 60 which is external to the cable mounting tube 28.

FIG. 4 is an elevational view of the interior transom 16 of the outboard motorboat 12 of FIG. 3 after the installation of a conventional sheathed cable steering system 30 on the outboard motor 24. The second end 46 of the outer sheath 42 is affixed to the externally threaded entrance end 27 of cable mounting tube 28 by the sheath nut 48. The second end 50 of the inner cable 38 comprising the rigid rod 52 extends through and exits from the externally threaded exit end 29 of cable mounting tube 28. The steering link 54 connects the rigid rod 52 to the tiller arm 56 of the outboard motor 24. The finish nut 62 is affixed to the externally threaded exit end 29 of cable mounting tube 28 opposite the connection of the outer sheath 42 and the sheath nut 48. A rotation of the steering wheel 32 effects an extension or a retraction of the rigid rod 52 relative to the outboard motor mount 26 by means of the helm unit 34. Since the rigid rod 52 is affixed to the inner cable 38 and the motor mount 26 is affixed to the outer sheath 42 by the sheath nut 48, the linear extension or retraction of the rigid rod 52 effects a pivoting of the outboard motor 24 about the vertical pivoting axis 24A to steer the outboard motorboat 12 as should be well known to those skilled in the art.

Unfortunately, the sheathed cable steering system 30 of the prior art suffered from a serious corrosion problem since the extension and retraction of the rigid rod 52 permits the entry of foreign materials into the cable mounting tube 28. The entry of corrosive materials such as seawater produces corrosion between the inner cable 38 and the cable mounting tube 28.

Figure 5:
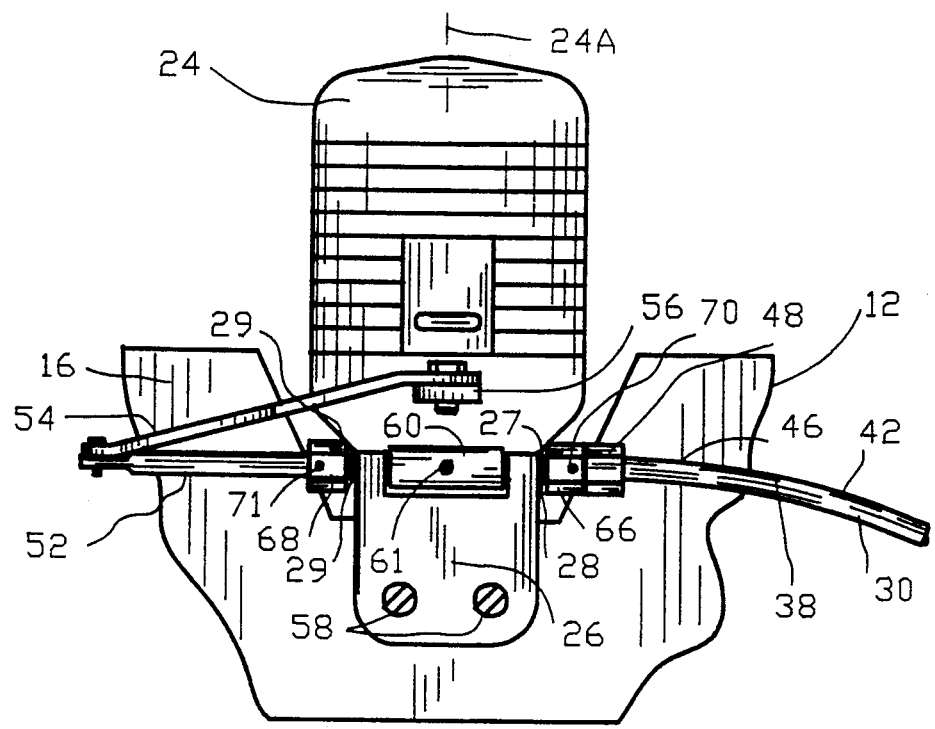
FIG. 5 is an elevation view of the interior transom of an outboard motorboat of FIG. 4.
Figure 10:
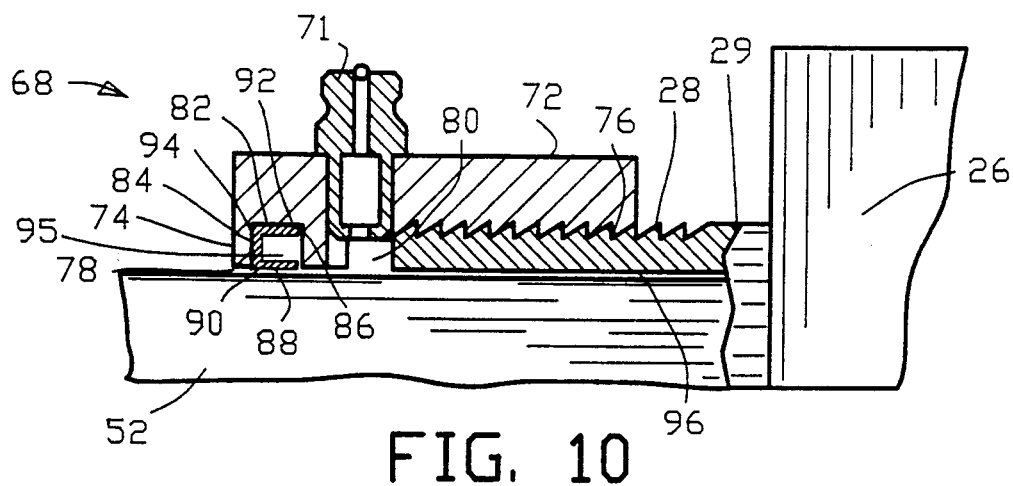
FIG. 10 is a cross-sectional view of the nut body installed on a cable mounting tube prior to the introduction of a lubricant.
Figure 11:
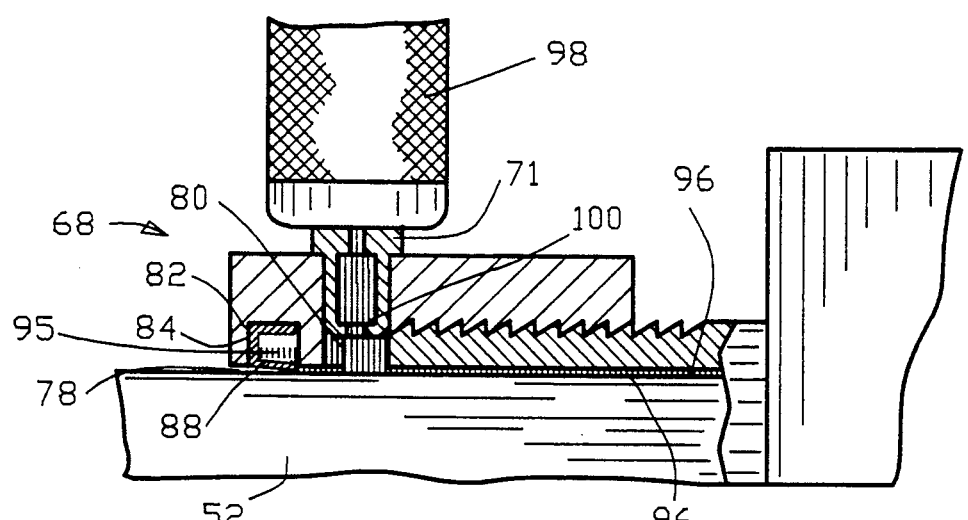
FIG. 11 is a cross-sectional view of the nut body described in FIG. 10 illustrating the initial stages of the introduction of the lubricant.
Figure 12:
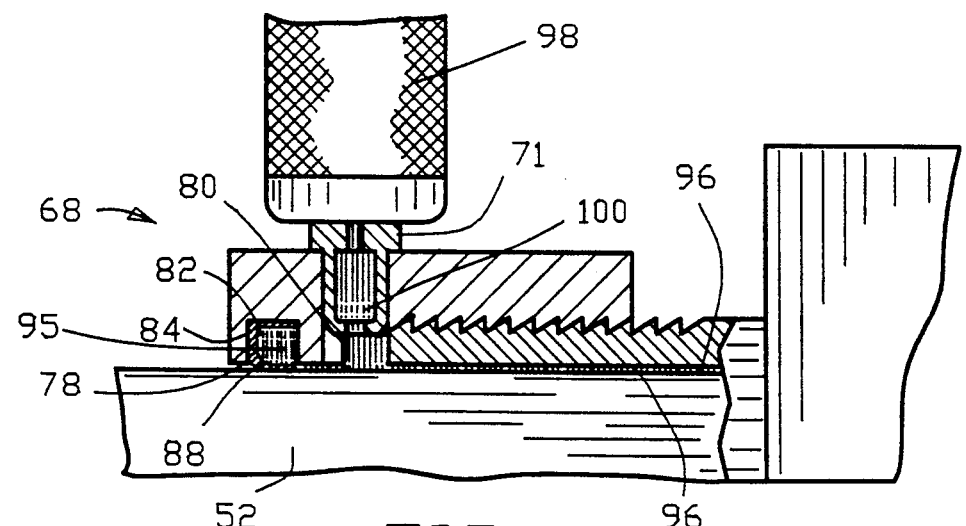
FIG. 12 is a cross-sectional view of the nut body described in FIG. 11 illustrating the completion of the introduction of the lubricant and subsequent deformation of the resilient seal ring.

FIG. 5 is an elevational view of the interior transom 16 of an outboard motorboat 12 of FIG. 4 incorporating the present invention including an adaptor nut 66 and a sealing nut 68. FIGS. 6–9 illustrate various views of the sealing nut 68 whereas FIGS. 13–16 illustrate various views of the adaptor nut 66 As best shown in FIG. 16, the second end 46 of the outer sheath 42 is threadably affixed to externally threaded tube 106 of the adaptor nut 66 by means of the sheath nut 48. The adaptor nut 66 is affixed to the externally threaded entrance end 27 of the cable mounting tube 28 by means of a threaded bore 102 of the adapter nut 66. As best shown in FIGS. 10–12, the second end 50 of inner cable 38 comprising the rigid rod 52 extends through the sealing nut 68 which is affixed to the externally threaded exit end 29 of the cable mounting tube 28 by means of the threaded bore 76 of the sealing nut 68.

An important aspect of the present invention is the addition of grease fittings 70 and 71 respectively affixed to the adaptor nut 66 and the sealing nut 68 to permit the addition of a lubricant into the cable mounting tube 28.

Figure 6:
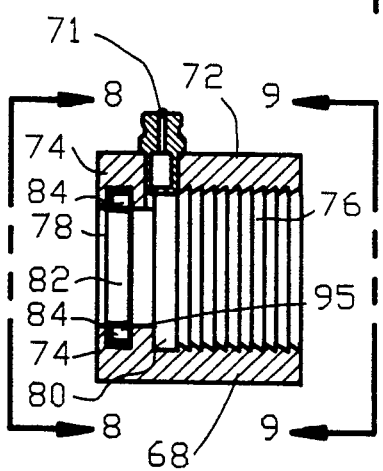
FIG. 6 is a cross-sectional view of a nut body.
Figure 8:
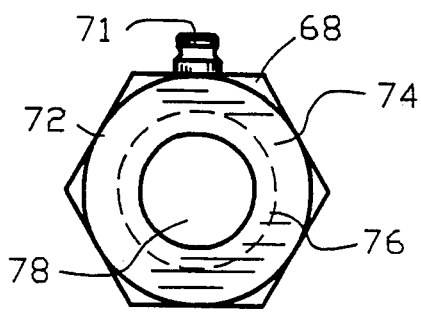
FIG. 8 is an end view along line 8—8 of FIG. 6 of the nut body.
Figure 9:
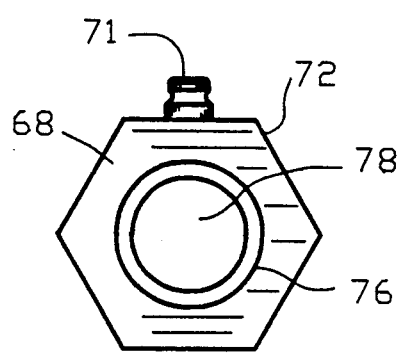
FIG. 9 is an end view along line 9—9 of FIG. 6 of the nut body.

Referring to FIGS. 6, 8 and 9, the sealing nut 68 of the present invention comprises a nut body 72 which may be constructed from a metallic material or a plastic composite material. The threaded bore 76 partially extends through nut body 72 with the diameter of threaded bore 76 being commensurate with the diameter of the externally threaded exit end 29 of cable mounting tube 28 for enabling a threaded engagement therebetween. The nut body 72 is provided with an end wall 74 which contains cable bore 78. The diameter of cable bore 78, which may support inner cable 38, is commensurate with the diameter of inner cable 38 and is substantially less than the diameter of the threaded bore 76. An intermediate bore 80 has a diameter substantially equal to the threaded bore 76 and is placed between the threaded bore 76 and the cable bore 78. The grease fitting 71 is affixed to the nut body 72 and communicates with the intermediate bore 80 allowing for the addition of a lubricant into the intermediate bore 80 and the cable bore 78.

An annular recess 82 having a substantially square cross-section is machined into the cable bore 78. A resilient seal ring 84 is placed in the annular recess 82 for providing a seal between the cable bore 78 of the nut body 72 and the inner cable 38 to prevent incursion of an external foreign matter and to retain a lubricant internal to sheathed cable steering system 30.

Figure 7:
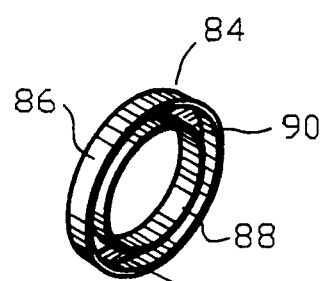
FIG. 7 is an isometric view of a resilient seal.

FIG. 7 is a isometric view of the resilient seal ring 84 comprising an outer annular ring 86 and an inner annular ring 88 connected by a web 90. The resilient seal ring 84 has a substantially squared, U-shaped cross-section defining a grease cavity 95.

FIGS. 8 and 9 are end views along line 8—8 and line 9—9 of FIG. 6 illustrating the nut body 72, the end wall 74, the cable bore 78, the grease fitting 71 and the threaded bore 76.

FIG. 10 is a cross-sectional view of the sealing nut 68 of the present invention installed on a cable mounting tube 28 prior to the introduction of a lubricant. The sealing nut 68 comprising the nut body 72, the grease fitting 71 and the resilient seal ring 84 is illustrated with the threaded bore 76 threaded onto the externally threaded exit end 29 of the cable mounting tube 28 of the outboard motor mount 26. The rigid rod 52 extends through the cable mounting tube 28 and the sealing nut 68. The resilient seal ring 84 disposed within the annular recess 82 of cable bore 78 with the outer annular ring 86 contacting with the annular recess base 92. The web 90 of resilient seal ring 84 contacts with the recess sidewall 94 proximate the end wall 74 of the nut body 72. The inner annular ring 88 of the resilient seal ring 84 is disposed adjacent the rigid rod 52 of the inner cable 38. The cable bore 78 provides support for the rigid rod 52 of the inner cable 38. Interstices 96 are defined as the volume occupied between the rigid rod 52 and cable mounting tube 28 and the sealing nut 68.

FIG. 11 is a cross-sectional view of the sealing nut 68 of the present invention described in FIG. 10 illustrating the initial stages of the introduction of a lubricant 100 into the grease fitting 71 by a grease gun 98. The introduction of the lubricant 100 through grease fitting 71 allows the lubricant 100 to flow into and through the intermediate bore 80 and into the interstices 96. The flow of lubricant 100 into the grease cavity 95 of the resilient seal ring 84 produces a partial deformation of the inner annular ring 88. The inner annular ring 88 is deformed toward the rigid rod 52 and exerts a partial sealing force against the surface of rigid rod 52.

FIG. 12 is a cross-sectional view of sealing nut 68 of the present invention described in FIG. 11 illustrating the completion of the addition of lubricant 100 through grease fitting 71 into and through intermediate bore 80 and into the interstices 96. The flow of lubricant 100 into resilient seal ring 84 disposed within annular recess 82 produces a further deformation of the inner annular ring 88 whereby the inner annular ring 88 exerts sealing a force against the surface of rigid rod 52. The complete deformation of the inner annular ring 88 of the resilient seal ring 84 creates a substantial seal between the rigid rod 52 and the seal nut 68 whereby the further addition of the lubricant causes the lubricant to flow into the cable mounting tube 28. The further addition of the lubricant 100 causes the lubricant 100 to fill the cable mounting tube 28 and to flow into the sheath cable steering system 30. The seal between the rigid rod 52 and the seal nut 68 by the inner annular ring 88 of the resilient seal ring 84 prevents the incursion of external foreign matter to inhibit the development of corrosion of the cable mounting tube 28 and the sheathed cable steering system 30. In should be appreciated that the construction of the resilient seal ring 84 and the deformation of the inner annular ring 88 by the injected lubricant 100 establishes a positive pressure within the grease cavity 95 and within the cable mounting tube 28 and the sheathed cable steering system 30. The positive pressure within the cable mounting tube 28 and the sheathed cable steering system 30 assists in preventing the incursion of external foreign matter into the cable mounting tube 28 and the sheathed cable steering system 30.

Figure 13:
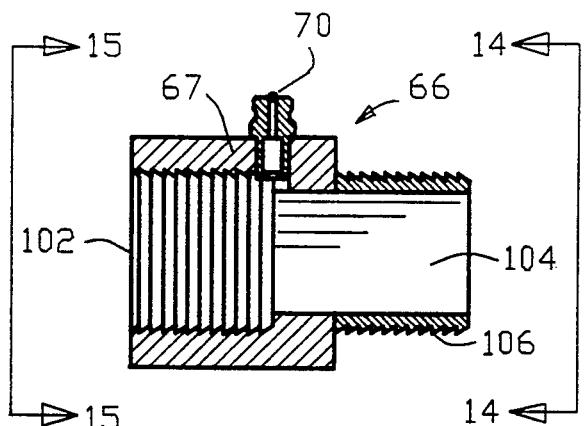
FIG. 13 is a cross-sectional view of the adapter nut body.

FIG. 13 is a cross-sectional view of the adaptor nut 66 comprising an adapter nut body 67 which may be constructed from a metallic material or a plastic composite material. A threaded bore 102 extends only partially through the adaptor nut body 67. The diameter of the threaded bore 102 is commensurate with the diameter of the externally threaded entrance end 27 of the cable mounting tube 28. A cable bore 104 extending only partially through the adaptor nut body 67 communicates with the threaded bore 102. The diameter of the cable bore 104 is commensurate with the diameter of the rigid rod 52 of the inner cable 38 and is substantially less than the threaded bore diameter 102. The grease fitting 70 affixed to the adaptor nut body 67 communicates with the cable bore 104 for introducing of the lubricant 100 into the cable bore 104. The externally threaded tube 106 has an externally threaded diameter commensurate rate with the internally threaded diameter of sheath nut 48 for enabling a threadable connection therebetween.

Figure 14:
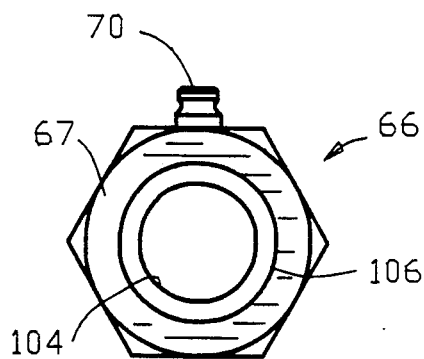
FIG. 14 is an end view along line 14—14 of FIG. 13 of the adaptor nut body.
Figure 15:
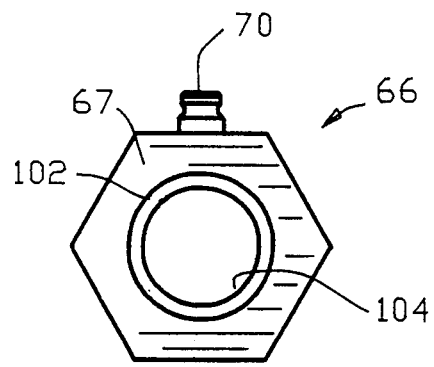
FIG. 15 is an end view along line 15—15 of FIG. 13 of the adaptor nut body.
Figure 16:
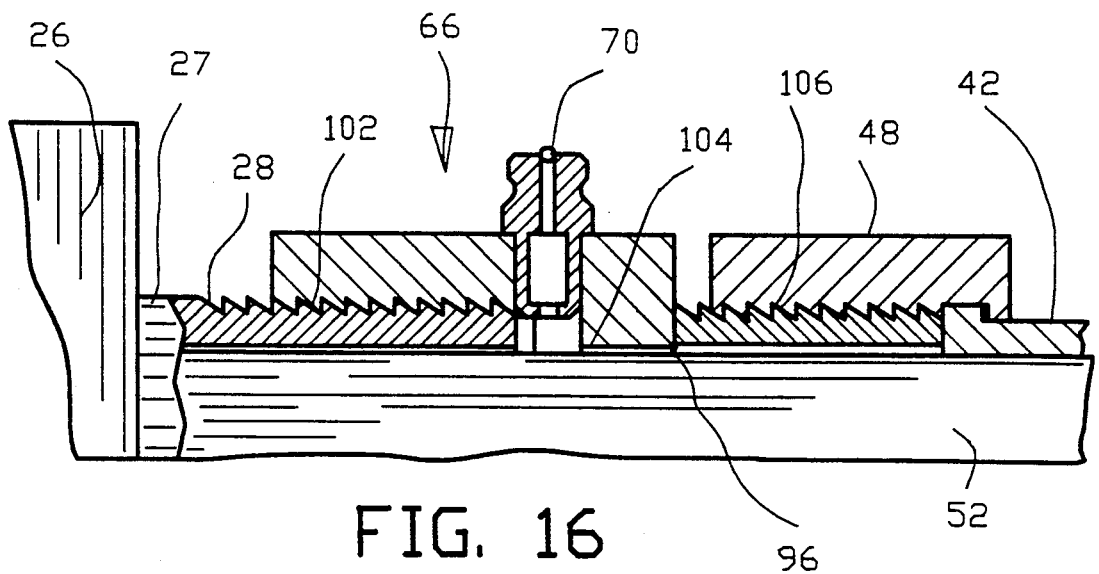
FIG. 16 is a cross-sectional view of the adaptor nut body installed on a cable mounting tube illustrating the introduction of a lubricant.

FIGS. 14 and 15 are end views along line 14—14 and line 15—15 of FIG. 13 of the adaptor nut 66 illustrating the adaptor nut body 67, the grease fitting 70, the cable bore 104 and the externally threaded tube 106.

FIG. 16 is a cross-sectional view of the adaptor nut 66 installed on the externally threaded entrance end 27 of the cable mounting tube 28 prior to the introduction of the lubricant 100. The adaptor nut 66 is threadably affixed to the externally threaded entrance end 27 of the cable mounting tube 28 proximate the outboard motor mount 26. The threaded bore 102 communicates with the externally threaded entrance end 27 of the cable mounting tube 28. The sheath nut 48 is removably affixed to the adaptor nut 66 by means of the externally threaded tube 106 of the adapter nut 66. The outer sheath 42 is likewise affixed to the adaptor nut 66 by means of the sheath nut 48. Interstices 97 are defined as a volume between the surface of the rigid rod 52 and the surface of cable mounting tube 28.

The introduction of the lubricant 100 through grease fitting 71 allows lubricant 100 to flow into and through the cable bore 104 and into the interstices 97. The flow of lubricant 100 continues through the cable bore 104 into the cable mounting tube 28. The further addition of the lubricant 100 causes the lubricant 100 to fill the cable mounting tube 28 and to flow into the sheath cable steering system 30. Since the adapter nut 66 is void of any seal similar to the resilient seal ring 84, the lubricant 100 may flow either into the cable mounting tube 28 or flow into the sheath cable steering system 30.

Figure 23:
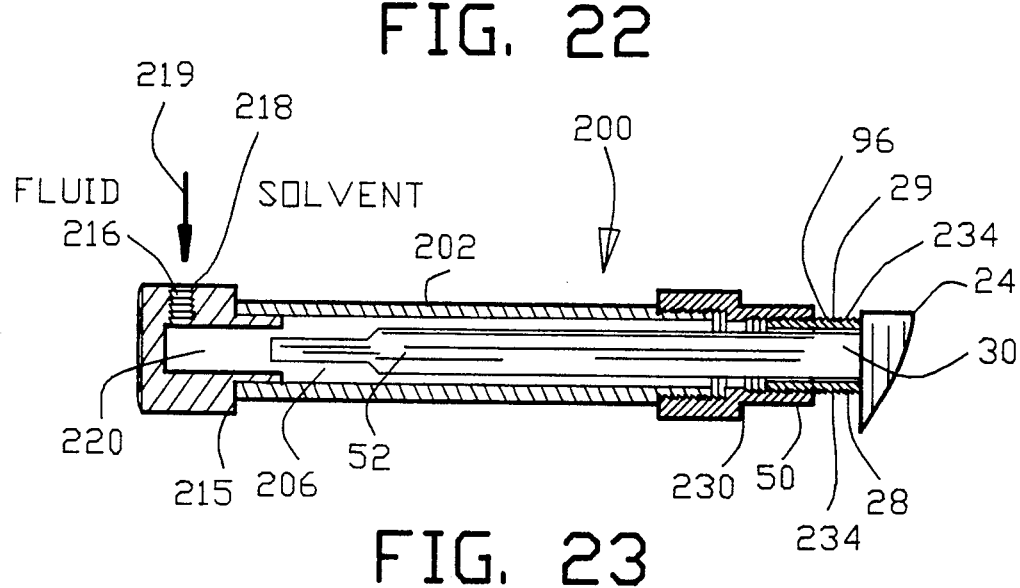
FIG. 23 is an enlarged sectional view of a portion of FIG. 22.
Figure 24:
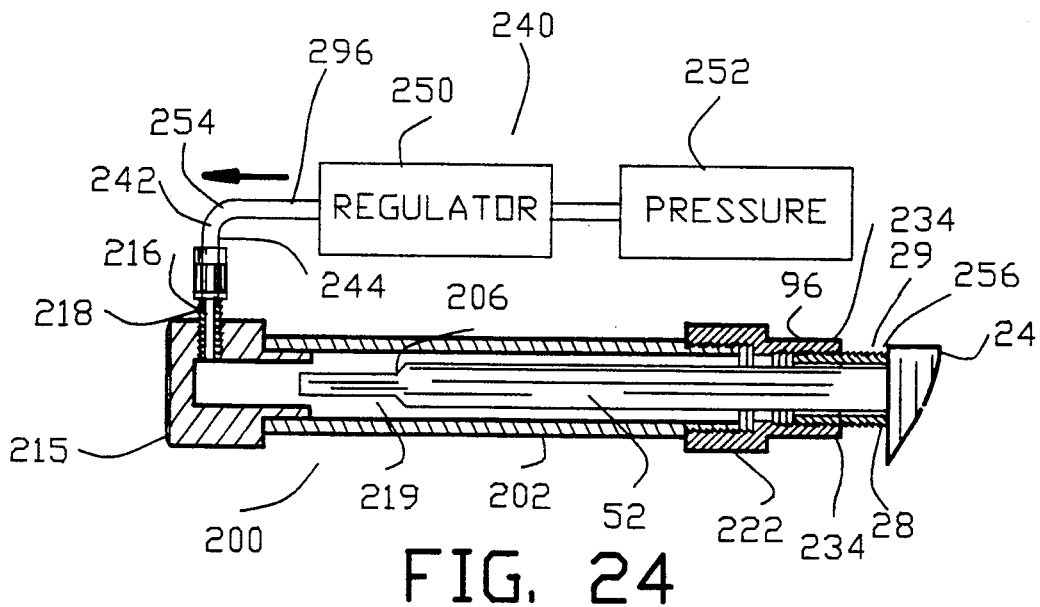
FIG. 24 is a view similar to FIG. 23 with the pressurizer tube being connected to a pressure source and regulator means for introducing a fluid solvent.

FIGS. 17-21 illustrate various views of the pressurizer tube assembly 200 comprising pressurizer tube 202 having a sidewall 204 defining a pressurizer tube bore 206 extending between a first end 208 and a second end 210. Pressurizer tube threads 209 are defined at the second end 210 of pressurizer tube 202. The pressurizer tube bore 206 has a minimum diameter determined by the diameter of rigid rod 52 of the second end 50 of inner cable 38 as shown in FIGS. 23 and 24. The pressurizer tube 202 may be fabricated from a metallic pipe, tubing, or in the alternative may be molded from a composite material.

An end cap 212 is secured in a fluid tight relationship to the first end 208 of the pressurizer tube 202. Sealing means 215 comprises an insert portion 217 of the end cap 212 engaging the pressurizer tube bore 206. In this embodiment, the sealing means 215 comprises a press fit relationship between the insert portion 217 of the end cap 212 and the pressurizer tube bore 206 but it should be understood that the other means may be used to seal the end cap 212 to the pressurizer tube bore 206 An outer surfaces 214 of the end cap 212 defines a nut for facilitating the threadable engagement between the pressurizer tube assembly 200 and the cable mounting tube 28.

An input means 216 comprises a threaded aperture 218 extending from an end cap outer surface 214 to an end cap transfer bore 220 for providing a path for fluid and pressurized gas into the pressurizer tube bore 206.

A connecting means 222 is shown as a threaded coupler 224 having a first end 226 and a second end 228 and a threaded coupler bore 230. The second end 210 of the pressurizer tube 202 is threadably affixed to the first end 226 of threaded coupler 224 with the pressurizer tube bore 206 communicating with the threaded coupler bore 230.

Figure 22:
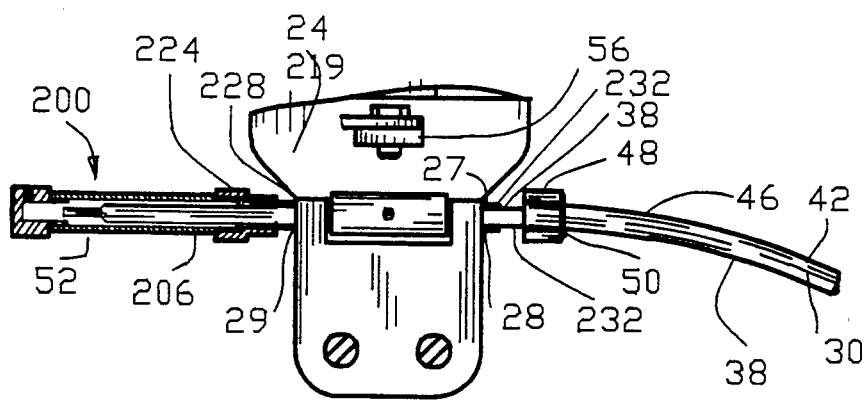
FIG. 22 is an elevation view of the pressurizer tube with sealing means and connecting means of the present invention installed on the cable mounting tube of an outboard motor for introducing a fluid solvent.

FIG. 22 is an elevation view of the pressurizer tube assembly 200 installed on the exit end 29 of a cable mounting tube 28 of the outboard motor 24 utilizing a sheathed cable steering system 30. The cable steering system sheath nut 48 is disconnected from the cable mounting tube 28 of an outboard motor 24. The second end 50 of the inner cable 38 comprising the rigid rod 52 extends through and exits from the externally threaded exit end 29 of cable mounting tube 28. The steering link 54 is disconnected from the rigid rod 52.

Unfortunately, the sheathed cable steering system 30 of the prior art suffered from a serious corrosion problem since the extension and retraction of the rigid rod 52 permits the entry of foreign materials into the cable mounting tube 28. The entry of corrosive materials such as seawater produces corrosion between the rigid rod 52 and the cable mounting tube 28. Removal of sheath nut 48 and steering link 54, followed by the installation of the pressurizer tube assembly 200 by means of engagement of connecting threads of second end 228 of threaded coupler 224 and the threaded exit end 29 of cable mounting tube 28 provides an encapsulation of rigid rod 52.

The pressurizer tube assembly 200 provides communication between input means 216 through the pressurizer tube bore 206 and cable mounting interstices 96. Removal of sheath nut 48 provides communication to the atmosphere 232 from the encapsulated rigid rod 52 and second end 50 of inner cable 38.

The rigid rod 52 comprising the second end 50 of inner cable 38 occupies a position within the pressurizer bore 206. Foreign materials 234 are illustrated in the cable mounting tube interstices 96. These foreign materials comprise dirt, corrosion products, and the like, which prevent proper operation of the sheathed cable steering system 30.

FIG. 23 illustrates a fluid solvent 219 being introduced into the encapsulated area defined by transfer bore 220, pressurizer bore 206, threaded coupler bore 230, and cable mounting tube interstices 96 by means of threaded aperture 218 of input means 216.

FIG. 24 is a view similar to FIG. 23 illustrating pressure means 240 comprising a flexible pressure tube 242 having a first end 244 and a second end 246. A threaded fitting 248 is disposed at the first end 244 of the flexible pressure tube 242 for threadably engaging with the input threaded aperture 218. A pressure regulating means 250 connects the second end 246 of the flexible pressure tube 242 to a pressurized gas source 252 for regulating the pressurized gas 254 to the pressurizer tube bore 206. The application of pressurized gas 254 emanating from pressurized gas source 252 imposes a force on fluid solvent 219 causing fluid solvent 219 to migrate through the pressurizer tube bore 206, the cable mounting tube 28 and the interstices 96 to remove corrosion from interior walls 256 of cable mounting tube 28 and surface of rigid rod 52. The fluid solvent 219 and foreign material 234 discharge from exit end 29 of the cable mounting tube 28.

Figure 25:
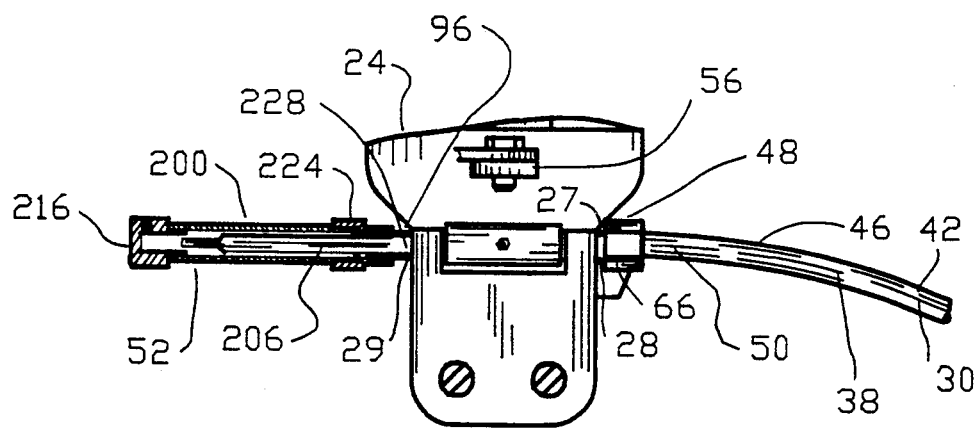
FIG. 25 is an elevation view of the pressurizer tube with sealing means and connecting means of the present invention installed on the cable mounting tube of an outboard motor for introducing a fluid lubricant.

FIG. 25 is an elevation view of the pressurizer tube assembly 200 similar to FIG. 22 with the second end 46 of the outer sheath 42 being affixed to the externally threaded entrance end 27 of cable mounting tube 28 by the sheath nut 48. In this arrangement, the pressurizer bore 206 communicates through cable mounting tube interstices 96 to inner cable 38 of sheathed cable steering system 30.

Figure 26:
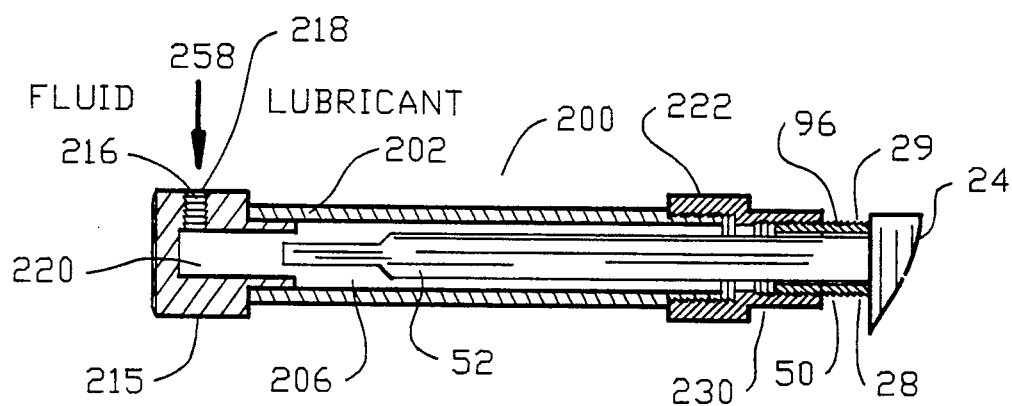
FIG. 26 is a an enlarged sectional view of a portion of FIG. 25.

FIG. 26 illustrates a fluid lubricant 258 being introduced into the encapsulated area defined by transfer bore 220, pressurizer bore 206, threaded coupler bore 230, and cable mounting tube interstices 96 by means of threaded aperture 218 of input means 216.

Figure 27:
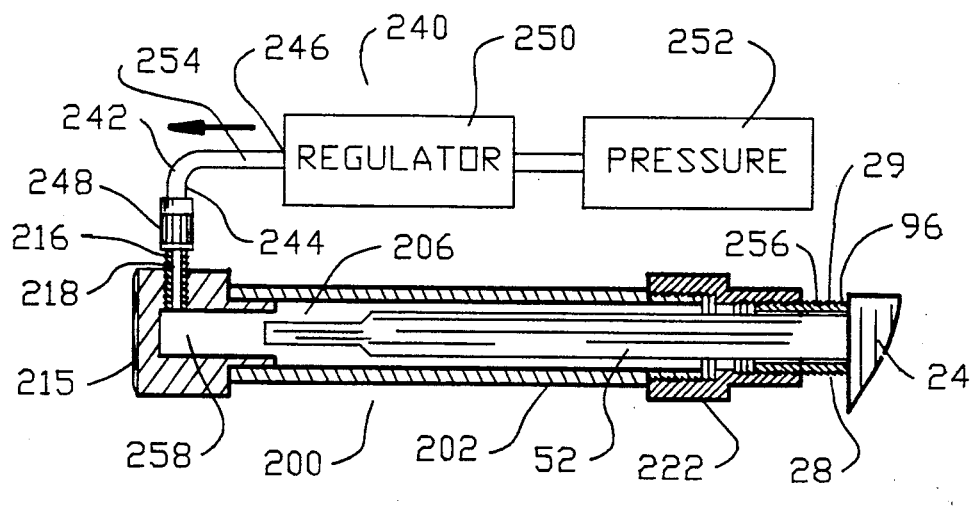
FIG. 27 is a view similar to FIG. 26 with the pressurizer tube being connected to a pressure source and regulator means for introducing a fluid lubricant.

FIG. 27 is a view similar to FIG. 26 illustrating the threaded fitting 248 disposed at the first end 244 of the flexible pressure tube 242 threadably engaging with the input threaded aperture 218. A pressure regulating means 250 connects the second end 246 of the flexible pressure tube 242 to a pressurized gas source 252 for regulating the pressurized gas 254 to the pressurizer tube bore 206. The application of pressurized gas 254 emanating from pressurized gas source 252 imposes a force on the fluid lubricant 258 causing fluid lubricant 258 to migrate through the pressurizer tube bore 206, the cable mounting tube 28 and the interstices 96 for lubricating interior walls 256 of cable mounting tube 28 and surface of rigid rod 52. The pressurized gas source 252 also causes the fluid lubricant 258 to migrate into the inner cable 38 of sheathed cable steering system 30.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A system for introducing a liquid into a cable mounting tube of an outboard motor for treating an inner cable of a motorboat steering device within the cable mounting tube of the outboard motor, the steering device comprising the inner cable being linearly movable within an outer sheath will the outer sheath having a sheath nut for threadably affixing to a threaded entrance end of the cable mounting tube with a distal end of the inner cable extending from a threaded exit end of the cable mounting tube, the distal end of the inner cable being connected for pivoting the outboard motor in response to the motorboat steering deice, wherein the sheath nut is removed from the threaded entrance end of the cable mounting tube and the distal end of the inner cable connection is disconnected from the outboard motor;

the improvement comprising:

a pressurizer tube having a sidewall extending between a first and a second end defining a pressurizer tube bore, said pressurizer tube having a longitudinal length extending between said first end and said second ends sufficient to enable said pressure tube bore to receive the distal end of the inner cable therein;

sealing means for sealing said second end of said pressurizer tube;

an input aperture orientated generally perpendicular to said longitudinal length of said pressurizer tube and communicating with said pressurizer tube bore;

threaded connecting means disposed at said first end of said pressurizer tube for threadably attached said pressurizer tube to the threaded exit end of the cable mounting tube with the distal end of the inner cable being disposed therein;

said threaded connecting means enabling said pressurizer tube to be rotated relative to the threaded exit end of the cable mounting tube to orient said input aperture in a generally upright position;

said generally upright position of said input aperture enabling the introduction of the liquid into said pressurizer tube bore of said pressurizer tube to substantially fill said pressurizer tube bore with the liquid; and pressure means being affixable to said input aperture communicating with said pressurizer tube bore for applying a pressurized gas to said pressurizer tube bore or driving the liquid into the cable mounting tube for treating the inner cable thereby.

2. A system for introducing a liquid as set forth in claim 1, wherein said threaded connecting means includes connecting thread defined at said first end of said pressurizer tube;

a threaded coupler having a first and a second threaded coupler end;

said first threaded coupler end of said threaded coupler threadably engaging with said connecting thread of said pressurizer tube; and said second threaded coupler end of said threaded coupler threadably engaging with the threaded exit end of the cable mounting tube.

3. A system for introducing a liquid as set forth in claim 1, wherein said threaded connecting means includes connecting thread defined at said first end of said pressurizer tube;

a thread coupler having a first and a second threaded coupler end;

said first threaded coupler end of said threaded coupler threadably engaging with said connecting thread of said pressurizer tube;

said second threaded coupler end of said threaded coupler threadably engaging with the threaded exit end of the cable mounting tube;

said sealing means comprises an end cap secured to said second end of said pressurizer tube; and said end cap having an outer surface defining a nut for facilitating the threadable engagement and rotation between said pressurizer tube and the cable mounting tube.

4. A system for introducing a liquid as set forth in claim 1, wherein said sealing means comprises an end cap secured to said second end of said pressurizer tube; and said input aperture comprising a threaded aperture extending through said end cap communicating with said pressurizer tube bore of said pressurizer tube.

5. A system for introducing a liquid as set forth in claim 1, wherein said input aperture comprises a threaded aperture communicating with said pressurizer tube bore of said pressurizer tube; and said pressure means being affixable to said threaded aperture for applying a pressurized gas to said pressurizer tube bore of said pressurizer tube.

6. A system for introducing a liquid as set forth in claim 1, wherein said pressure means includes a pressure regulating means for regulating the pressurized gas to said pressurizer tube bore.

7. A system for introducing a liquid as set forth in claim 1, wherein said input aperture comprises an input threaded aperture communicating with said pressurizer tube bore of said pressurizer tube;

said pressure means comprises a flexible pressure tube having a distal end and a proximal end;

a threaded fitting disposed at a distal end of said flexible pressure tube for threadably engaging with said input threaded aperture; and means for connecting said proximal end of said flexible pressure tube to a source of pressurized gas.

8. A system for introducing a liquid as set forth in claim 1, wherein said input aperture comprises an input threaded aperture communicating with said pressurizer tube bore of said pressurizer tube;

said pressure means comprises a flexible pressure tube having a distal end and a proximal end;

a threaded fitting disposed at a distal end of said flexible tube for threadably engaging with said input threaded aperture; and pressure regulating means connecting said proximal end of said flexible pressure tube to a source of pressurized gas for regulating the pressurized gas to said pressurized tube bore.

9. A system for introducing a liquid as set forth in claim 1, wherein the liquid is a corrosion dispersion liquid to disperse corrosion within the cable mounting tube of the outboard motor.

10. A system for introducing a liquid as set forth in claim 1, wherein the liquid is a solvent liquid to dissolve corrosion within the cable mounting tube of the outboard motor.

11. A system for introducing a liquid as set forth in claim 1, wherein the liquid is a lubricant to lubricate the inner cable of the motorboat steering device.

* * * * *